United States Patent
Tsai et al.

(10) Patent No.: US 11,875,683 B1
(45) Date of Patent: *Jan. 16, 2024

(54) FACIAL RECOGNITION TECHNOLOGY FOR IMPROVING MOTOR CARRIER REGULATORY COMPLIANCE

(71) Applicant: Samsara Inc., San Francisco, CA (US)

(72) Inventors: Evaline Shin-Tin Tsai, Cupertino, CA (US); Alan Guihong Liu, San Francisco, CA (US); Ijeoma Emeagwali, San Francisco, CA (US); Ishaan Kansal, San Francisco, CA (US); Saleh ElHattab, San Francisco, CA (US); Bodecker John DellaMaria, Crystal Lake, IL (US); Eliott Ray Chapuis, San Francisco, CA (US); Jason Noah Laska, San Francisco, CA (US); Jennifer Kao, San Francisco, CA (US); Sean Kyungmok Bae, San Francisco, CA (US); Sylvie Lee, Pittsburgh, PA (US); Brian Tuan, Cupertino, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,985

(22) Filed: Nov. 9, 2022

Related U.S. Application Data

(63) Continuation of application No. 16/929,704, filed on Jul. 15, 2020, now Pat. No. 11,557,208.

(Continued)

(51) Int. Cl.
*G08G 1/00* (2006.01)
*G06N 20/00* (2019.01)
(Continued)

(52) U.S. Cl.
CPC ............... *G08G 1/20* (2013.01); *B60R 11/04* (2013.01); *G06N 20/00* (2019.01); *G06T 7/74* (2017.01);
(Continued)

(58) Field of Classification Search
CPC ... G08G 1/20; B60R 11/04; B60R 2300/8006; G06N 20/00; G06T 7/74; G06T 2200/24;
(Continued)

(56) References Cited

U.S. PATENT DOCUMENTS

| | | |
|---|---|---|
| 9,158,962 B1 | 10/2015 | Nemat-Nasser et al. |
| 9,501,878 B2 | 11/2016 | Palmer et al. |

(Continued)

FOREIGN PATENT DOCUMENTS

| | | | | |
|---|---|---|---|---|
| EP | 3410343 A1 | * 12/2018 | ......... | G06K 9/00295 |
| JP | 2020177419 A | * 10/2020 | ......... | G06F 16/4393 |

(Continued)

OTHER PUBLICATIONS

US 11,450,210 B2, 09/2022, Tsai et al. (withdrawn)
(Continued)

*Primary Examiner* — Mahendra R Patel
(74) *Attorney, Agent, or Firm* — Schwegman Lundberg & Woessner, P.A.

(57) ABSTRACT

Methods for improving compliance with regulations pertaining to vehicle driving records are disclosed. One or more digital images from a camera mounted in a vehicle are received. Based on a determination that the vehicle has hours of service that have not been assigned to a driver, a subset of the one or more digital images corresponding to the hours of service are identified based on the timestamps. The subset of the one or more digital images are processed to identify a correspondence between a face of a person included in the one or more digital images and a face of a (Continued)

known person. Based on the correspondence transgressing a threshold level of correspondence, a user interface is generated for presentation on a device. The user interface includes an interactive user interface element for accepting a recommendation to assign the known person as the driver for the unassigned hours of service.

20 Claims, 10 Drawing Sheets

Related U.S. Application Data

(60) Provisional application No. 62/909,327, filed on Oct. 2, 2019.

(51) Int. Cl.
  *G06T 7/73* (2017.01)
  *B60R 11/04* (2006.01)
  *G06V 20/59* (2022.01)
  *G06V 40/16* (2022.01)

(52) U.S. Cl.
  CPC ............ *G06V 20/59* (2022.01); *G06V 40/173* (2022.01); *B60R 2300/8006* (2013.01); *G06T 2200/24* (2013.01); *G06T 2207/30201* (2013.01); *G06T 2207/30268* (2013.01)

(58) Field of Classification Search
  CPC ........... G06T 2207/30201; G06T 2207/30268; G06V 20/59; G06V 40/173
  USPC ........................................................ 382/118
  See application file for complete search history.

(56) References Cited

U.S. PATENT DOCUMENTS

| | | | |
|---|---|---|---|
| 10,452,933 B1* | 10/2019 | Chan | G06V 20/597 |
| 10,556,597 B2 | 2/2020 | Yamashita et al. | |
| 10,783,386 B1* | 9/2020 | Li | G08B 21/22 |
| 11,157,723 B1* | 10/2021 | Shah | G06V 40/172 |
| 11,557,208 B2 | 1/2023 | Tsai et al. | |
| 11,620,909 B2 | 4/2023 | Tsai et al. | |
| 11,749,117 B1 | 9/2023 | Tsai et al. | |
| 11,758,096 B2 | 9/2023 | Shah et al. | |
| 2013/0073114 A1* | 3/2013 | Nemat-Nasser | B60W 40/09 382/104 |
| 2015/0105934 A1* | 4/2015 | Palmer | G07C 5/12 701/1 |
| 2016/0283483 A1* | 9/2016 | Jiang | G06F 21/6254 |
| 2018/0082304 A1* | 3/2018 | Summerlin | G06Q 20/3229 |
| 2018/0137678 A1* | 5/2018 | Kaehler | G06F 3/012 |
| 2018/0173934 A1* | 6/2018 | Zink | G06V 10/10 |
| 2018/0293462 A1 | 10/2018 | Ambati et al. | |
| 2018/0337994 A1* | 11/2018 | Dachille | G06F 21/6245 |
| 2018/0349736 A1* | 12/2018 | Bapat | G06V 40/10 |
| 2019/0047576 A1* | 2/2019 | Yamashita | G07C 5/008 |
| 2019/0188895 A1 | 6/2019 | Miller, IV et al. | |
| 2019/0325633 A1* | 10/2019 | Miller, IV | G06T 13/40 |
| 2020/0193531 A1 | 6/2020 | Bhatia et al. | |
| 2020/0279192 A1 | 9/2020 | Godfrey et al. | |
| 2020/0388150 A1* | 12/2020 | Herson | G06V 20/54 |
| 2021/0103719 A1 | 4/2021 | Tsai et al. | |
| 2021/0104159 A1 | 4/2021 | Tsai et al. | |
| 2021/0182705 A1 | 6/2021 | Bates | |
| 2022/0261572 A1 | 8/2022 | Shah et al. | |

FOREIGN PATENT DOCUMENTS

| | | | | |
|---|---|---|---|---|
| WO | WO-2006122164 A2 * | 11/2006 | ....... | G06F 17/30244 |
| WO | 2016160629 | 10/2016 | | |
| WO | WO-2016160629 A1 * | 10/2016 | ....... | G06F 17/30247 |
| WO | 2019095013 | 5/2019 | | |
| WO | WO-2019095013 A1 * | 5/2019 | ............ | A61B 3/103 |

OTHER PUBLICATIONS

"U.S. Appl. No. 17/447,366, Response filed Apr. 14, 2023 to Non Final Office Action dated Mar. 10, 2023", 8 pgs.
"U.S. Appl. No. 17/821,887, Notice of Allowance dated Apr. 26, 2023", 9 pgs.
"U.S. Appl. No. 17/447,366, Notice of Allowance dated Apr. 28, 2023", 11 pgs.
"U.S. Appl. No. 18/130,756, Preliminary Amendment filed Jun. 19, 2023", 7 pgs.
U.S. Appl. No. 16/929,704 U.S. Pat. No. 11,557,208, filed Jul. 15, 2020, Facial Recognition Technology for Improving Motor Carrier Regulatory Compliance.
U.S. Appl. No. 16/929,722 U.S. Pat. No. 11,620,909, filed Jul. 15, 2020, Improved Facial Recognition Technology for Improving Driver Safety.
U.S. Appl. No. 17/821,887, filed Aug. 24, 2022, Facial Recognition Technology for Improving Driver Safety.
U.S. Appl. No. 17/175,454 U.S. Pat. No. 11,157,723, filed Feb. 12, 2021, Facial Recognition for Drivers.
U.S. Appl. No. 17/447,366, filed Sep. 10, 2021, Facial Recognition for Drivers.
"U.S. Appl. No. 17/821,887, Notice of Allowance dated Jan. 5, 2023", 10 pgs.
"U.S. Appl. No. 16/929,722, Corrected Notice of Allowability dated Feb. 21, 2023", 2 pgs.
"U.S. Appl. No. 17/447,366, Non Final Office Action dated Mar. 10, 2023", 7 pgs.
"U.S. Appl. No. 17/175,454, Non Final Office Action dated Apr. 26, 2021", 14 pgs.
"U.S. Appl. No. 17/175,454, Response filed Jul. 26, 2021 to Non Final Office Action dated Apr. 26, 2021", 11 pages.
"U.S. Appl. No. 17/175,454, Notice of Allowance dated Aug. 18, 2021", 10 pages.
"U.S. Appl. No. 17/175,454, Examiner Interview Summary dated Sep. 22, 2021", 2 pages.
"U.S. Appl. No. 17/447,366, Preliminary Amendment filed Nov. 22, 2021", 6 pgs.
"U.S. Appl. No. 16/929,722, Notice of Allowance dated May 17, 2022", 9 pgs.
"U.S. Appl. No. 16/929,704, Notice of Allowance dated Sep. 16, 2022", 22 pgs.
"U.S. Appl. No. 17/821,887, Preliminary Amendment filed Sep. 26, 2022", 7 pgs.
U.S. Appl. No. 18/130,756, filed Apr. 4, 2023, Facial Recognition Technology for Improving Driver Safety.
"U.S. Appl. No. 18/130,756, Notice of Allowance dated Nov. 29, 2023", 10 pgs.

* cited by examiner

700

Assign a driver
Nov 29, 2018

Ⓐ 4453 Lynch Street, San Francisco CA
12:43 PM

Ⓑ 3182 Harrison Street, San Francisco CA
1:01 PM

🚌 182731

🕐 29m 26s (23.5 mi)

Driver

| Jose Ramos (Suggested) ▼ |

Duty Status

● Driving

○ Yard Move

○ Personal Conveyance

| Cancel | Save |

800

| | | | |
|---|---|---|---|
| Automatically Assigned [584] | Manually Assigned [0] | Unassigned [861] | |

🔍 Search faces     861 faces from Apr 9, 2019 5:22 PM - Apr 10, 2019 5:22 PM

| VEHICLE | DRIVER | SEEN AT ▼ | FACE |
|---|---|---|---|
| 964386 | Jose Ramos?<br>[YES] [NO] | Apr 10, 2019 5:22 PM | |
| 695625 | Bill DeVry?<br>[YES] [NO] | Apr 10, 2019 5:20 PM | |
| 110044 | Freddy Jones?<br>[YES] [NO] | Apr 10, 2019 5:16 PM | |
| 169018 | Joe Bean?<br>[YES] [NO] | Apr 10, 2019 5:06 PM | |

Safety Inbox

( Inbox (17) )  Starred   Archived   Dismissed

17 events from  Jul 10, 4:53 PM - Jul 11, 4:53 PM

| VEHICLE | DRIVER | EVENT BRAKE | LOCATION |
|---|---|---|---|
| ☐ 144523 | Assign | ● HARSH BRAKE | Houston, TX |
| ☐ 169010 | Yuniel Rodriguez | ● HARSH BRAKE | West 7th Street, Weatherford, TX |
| ☐ 665566 | Assign | ● HARSH BRAKE | Woodall Rodgers Freeway (Spur 366) Dallas, TX |
| ☐ 674173 | Assign | ● HARSH BRAKE | Pierce Elevated Houston, TX |

*FIG. 9*

FACIAL RECOGNITION TECHNOLOGY FOR IMPROVING MOTOR CARRIER REGULATORY COMPLIANCE

CROSS-REFERENCE TO RELATED APPLICATIONS

This application is a continuation of U.S. patent application Ser. No. 16/929,704, filed Jul. 15, 2020, which claims the benefit of U.S. Patent Application No. 62/909,327, filed Oct. 2, 2019, which are incorporated by reference herein in their entirety.

TECHNICAL FIELD

Embodiments of the present disclosure relate generally to the field of facial recognition technology and, more particularly, but not by way of limitation, to an architecture for systems and methods for using facial recognition technology to reduce unassigned hours of service (e.g., to allow a motor carrier to maintain compliance with government regulations).

BACKGROUND

Government regulations around the world, such as those established by the U.S. Federal Motor Carrier Safety Administration (FMCSA), may require a motor carrier to follow hours of service (HOS) rules (e.g., which may be designed to eliminate the type of drowsiness that can lead to crashes). Such rules may include requiring a motor carrier to either assign a vehicle's operating time to a driver or explain why a vehicle's operating time is unassigned to a driver. Current systems that may deployed by the motor carrier, such as electronic logging devices (ELDs) or token-detection systems, are often unable to capture all of the required driver assignment data, especially for large fleets of vehicles. Thus, the motor carrier may be faced with a significant burden (e.g., with respect to updating electronic records of duty status (RODS)) to establish or maintain regulatory compliance.

BRIEF DESCRIPTION OF THE DRAWINGS

To easily identify the discussion of any particular element or act, the most significant digit or digits in a reference number refer to the figure number in which that element is first introduced.

FIG. 8 is a diagram of an example user interface for efficiently resolving unassigned hours of service for multiple vehicles.

FIG. 9 is a diagram of an example user interface for improving driver safety.

DETAILED DESCRIPTION

Figure 1:
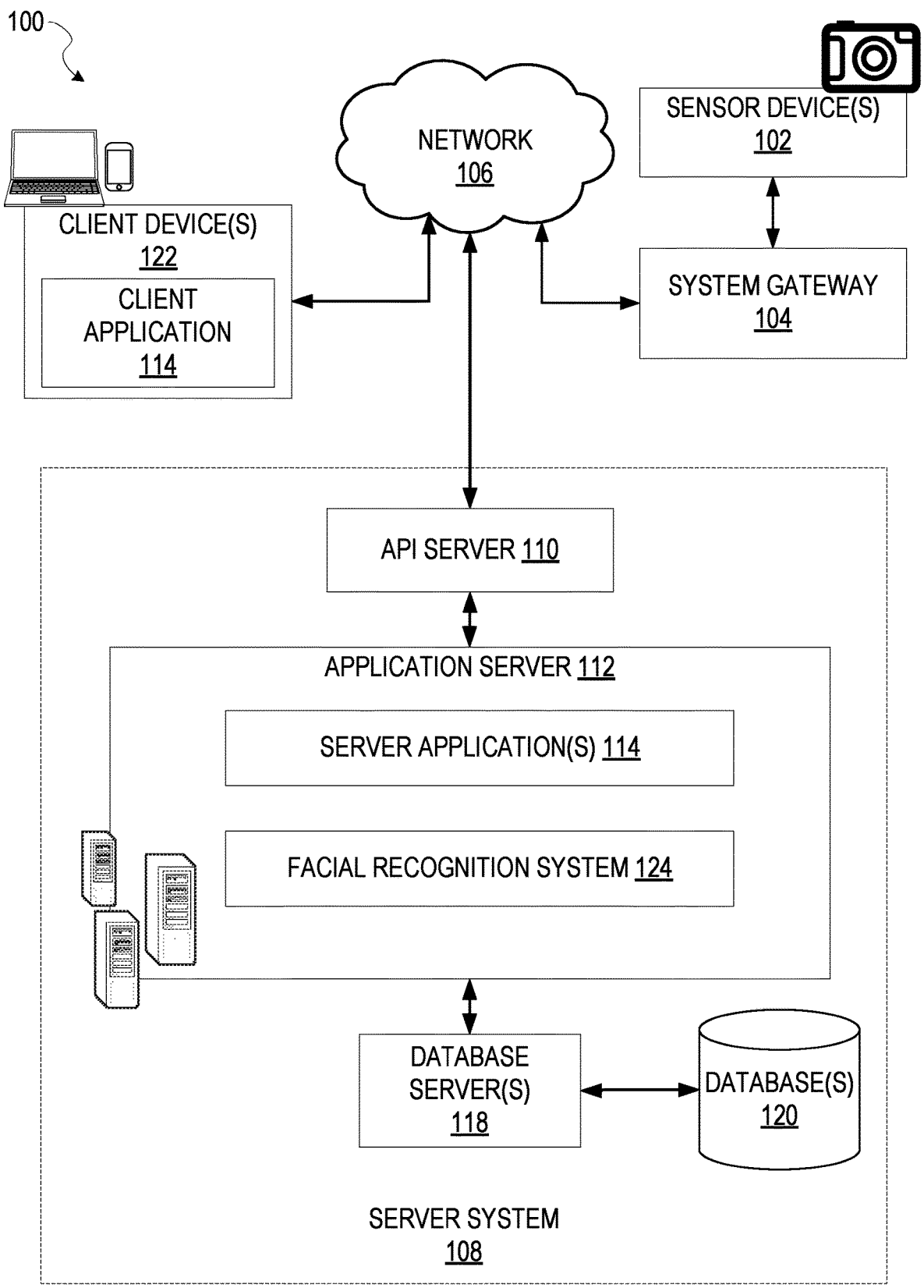
FIG. 1 is a block diagram showing an example system for exchanging data (e.g., sensor data and associated content) over a network in accordance with some embodiments, wherein the system includes a facial recognition system.

In the following description, for purposes of explanation, numerous specific details are set forth in order to provide an understanding of various embodiments of the present subject matter. It will be evident, however, to those skilled in the art that various embodiments may be practiced without these specific details.

While deployment by a motor carrier of ELDs across one or more fleets of vehicles may make it easier and faster for the motor carrier to accurately track, manage, and share RODS data, ELDs have various shortcomings with respect to tracking assignments of drivers to vehicles. For example, a driver may forget to log in or log out of the ELD, which results in unassigned hours of service or generation of inaccurate assignment data for the vehicle.

Additionally, while provision of key fobs by a motor carrier to its drivers may make it easier to associate each of its drivers with one or more vehicles, key fobs are unreliable in some situations. For example, when many vehicles are parked in close proximity to one another, it may be difficult to determine which key fob goes with which vehicle.

As a result, because of these various technical problems associated with generating complete or accurate vehicle assignment data using such systems, a motor carrier's electronically-stored RODS data may be incomplete and thus insufficient for the motor carrier to establish or maintain regulatory compliance.

A dashcam, or event data recorder (EDR), is an onboard camera that records a view (e.g., continuously) through a vehicle's front windscreen and sometimes the interior of the vehicle. Some EDRs also record acceleration, deceleration, speed, steering angle, global positioning system (GPS) data, and throttle position information.

In example embodiments, a method for improving compliance with regulations pertaining to vehicle driving records is disclosed. One or more digital images from a camera mounted in a vehicle are received. The one or more digital images are captured by the camera when the vehicle starts moving. The one or more digital images have corresponding timestamps. Based on a determination that the vehicle has hours of service that have not been assigned to a driver, a subset of the one or more digital images corresponding to the hours of service are identified based on the timestamps. The subset of the one or more digital images are processed to identify a correspondence between a face of a person included in the one or more digital images and a face of a known person. Based on the correspondence transgressing a threshold level of correspondence, a user interface is generated for presentation on a device of an administrator. The user interface includes an interactive user interface element for accepting a recommendation to assign the known person as the driver for the unassigned hours of service.

In example embodiments, input of the administrator (e.g., accepting or rejecting one or more recommendations to assign a known people as drivers) is fed back into a machine-learning system to improve the facial recognition technology with respect to photos containing images of drivers employed by the motor carrier. Thus, over time, the matches between the faces of images in the photo to known people are improved, requiring less and less manual intervention by the administrator to improve the vehicle-to-driver assignment data.

In example embodiments, a method of performing operations for improving driver safety across a fleet of vehicles is disclosed. A plurality of safety events pertaining to a driving of a fleet of vehicles by a plurality of drivers is detected. A subset of the events is identified. The subset corresponds to one or more safety events of the plurality of safety events involving one or more vehicles of the fleet of vehicles to which drivers have not been assigned. A user interface is generated for presentation on a client device. The user interface includes one or more interactive user interface elements for accessing the subset of the events. Based on an accessing of the subset of events, one or more user interface elements are provided for accepting or rejecting recommendations for assignments of one of the plurality of drivers to each of the vehicles. The recommendations are generated based on an application of a machine-learned model to images of faces captured inside the one or more vehicles when the safety events occurred.

These methods and various operations disclosed herein may be implemented as a computer system having one or more modules (e.g., hardware modules or software modules) that are specially designed and incorporated into the computer system to perform this method or one or more of the operations described herein. These methods and various operations disclosed herein may be embodied as instructions stored on a machine-readable medium that, when executed by one or more processors of a machine, cause the machine to perform the method or one or more of the various operations.

These methods and various operations disclosed herein provide specific improvements over prior art systems, including, for example, increasing the speed or efficiency by which a motor carrier may reduce or eliminate unassigned hours of service (e.g., thus improving an accuracy of electronically-stored RODS). For example, a motor carrier may be able to process a large number of data records having unassigned hours of service within a time frame required for submission or sharing of the data records with a regulatory body.

As discussed herein, an "event" may comprise a combination of conditions detected by the sensor devices. An administrator of the event detection system may provide event definitions, wherein each event definition includes one or more of: an event type or identifier (e.g., roll-over, crash, speeding, rolling stop, distracted driver); a set of thresholds; and a set of conditions represented by a set of sensor data from one or more sensor devices from among the plurality of sensor devices of the event detection system. For example, a "rolling stop" may be defined by a set of conditions that include: the presence of a stop sign in one or more frames of a video stream; inertial data indicating that a stop did not occur; and GPS data indicating that a vehicle did not stop at a location associated with the stop sign. Similarly, a "precursor" to the event may be defined by a portion of an event definition. For example, in the example of the "rolling stop" described above, a precursor to the event may be defined as the detection of the stop sign in one or more frames of the video stream.

In some embodiments, each event type or identifier of an event definition may be associated with corresponding object models. An object model of a particular event or precursor to an event includes the event definitions of the event and precursors to the events and defines procedures or subroutines to be performed by the event detection system in response to detecting an event or precursor to an event. For example, the procedures of an object model may define a data-flow of sensor data through one or more processing components of the event detection system, processing operations to be performed upon the sensor data at the one or more processing components of the event detection system, visualization and display instructions for the sensor data, as well as a bit rate (hereinafter "data rate") to generate and access the sensor data responsive to detecting an event or precursor to an event.

The detection of events and precursors to events may be performed by one or more processors associated with the plurality of sensor devices, one or more processors associated with the gateway, or by one or more processors associated with the server system, or any combination thereof.

According to certain example embodiments, the detection of events based on the sensor data may include: detecting events based on a comparison of sensor data to one or more thresholds defined by the event definitions; detecting events by detecting features within the sensor; and detecting events based on an output of a neural network (i.e., a time delayed neural network) trained to recognize features corresponding to certain events and precursors to events.

Accordingly, in some example embodiments, detection of an event by the plurality of sensors may be based upon video data generated by one or more cameras of the event detection system. For example, a neural network or machine learned model may be trained to recognize features or signals corresponding to certain types of objects that correspond with an event definition (e.g., signage, a stop sign, yield, children crossing, rail-road, etc.). In some embodiments, the signals detected may also include gestures performed by an occupant of a vehicle (e.g., a peace sign). Responsive to recognizing the features that correspond to the object associated with the event definition, the event detection system may access an object model associated with the corresponding event definition. An object model defines procedures and subroutines to be performed by the event detection system.

Similarly, detection of an event by the plurality of sensors may be based upon a stereoscopic inference model generated by the event detection system based on sensor data from one or more of the sensor devices. For example, the plurality of sensors may include a dashcam, and the sensor data may include video data that comprises monocular image data. The event detection system may generate a depth model based on the monocular image data through a stereoscopic inference model trained to construct a 3-dimensional (3D) depth model based on monocular image data. The event detection system may compare the depth model against one or more threshold values to detect events.

In further embodiments, the method of detecting an event may vary based upon the type of sensor data accessed and analyzed. In some embodiments the sensor data may include inertial data, audio data, or location data. Detecting of an event may therefore include detecting one or more values of the sensor data transgressing threshold values corresponding to event types. For example, an event may be triggered based on an inertial value transgressing a threshold value, or in further embodiments, an event may be triggered based on the location data generated by a sensor device transgressing a boundary, or reaching a destination.

The object models associated with events may further define presentation and display instructions for sensor data of the events. The presentation and display instructions may include an identification of one or more client devices to present a notification responsive to the detection of an event, as well as display instructions to visualize and display sensor data corresponding to events. For example, the notification may include a display of an identifier associated with a sensor device, as well as one or more event attributes of the detected event.

In example embodiments, severity levels of various detected events, such as those related to safe operation of fleet of vehicles by a plurality of drivers of those vehicles, may be specified (e.g., via a configuration administrative user interface). Then, for example, safety events may be ordered in order of their severity levels for presentation and processing. In example embodiments, a user interface may be presented on a client device for assigning drivers to safety events (e.g., based on a time of occurrence of the safety event and an identification of a driver of the vehicle at the time of occurrence, the identification being based on application of a machine-learned model for facial recognition, as explained in more detail below).

FIG. 1 is a block diagram showing an example system 100 for detecting events based on sensor data. The system 100 includes one or more client device(s) 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the system 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor device(s) 102, and the system gateway 104. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and a facial recognition system 124. The facial recognition system 124 is configured to access sensor data generated by the one or more sensor devices 102, such as a camera mounted on a dashboard of a vehicle, to for example, allow a motor carrier associated with the vehicle to accurately determine an identification of a driver who was operating the vehicle at a particular time. Further details of the facial recognition system 124 can be found in FIG. 2 below.

The server application 114 implements a number of data processing technologies and functions, particularly related to the aggregation and other processing of data (e.g., sensor data generated by the sensor devices 102). As will be described in further detail, the sensor data generated by the sensor devices 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor devices 102 and processed by the server application 114.

Figure 2:
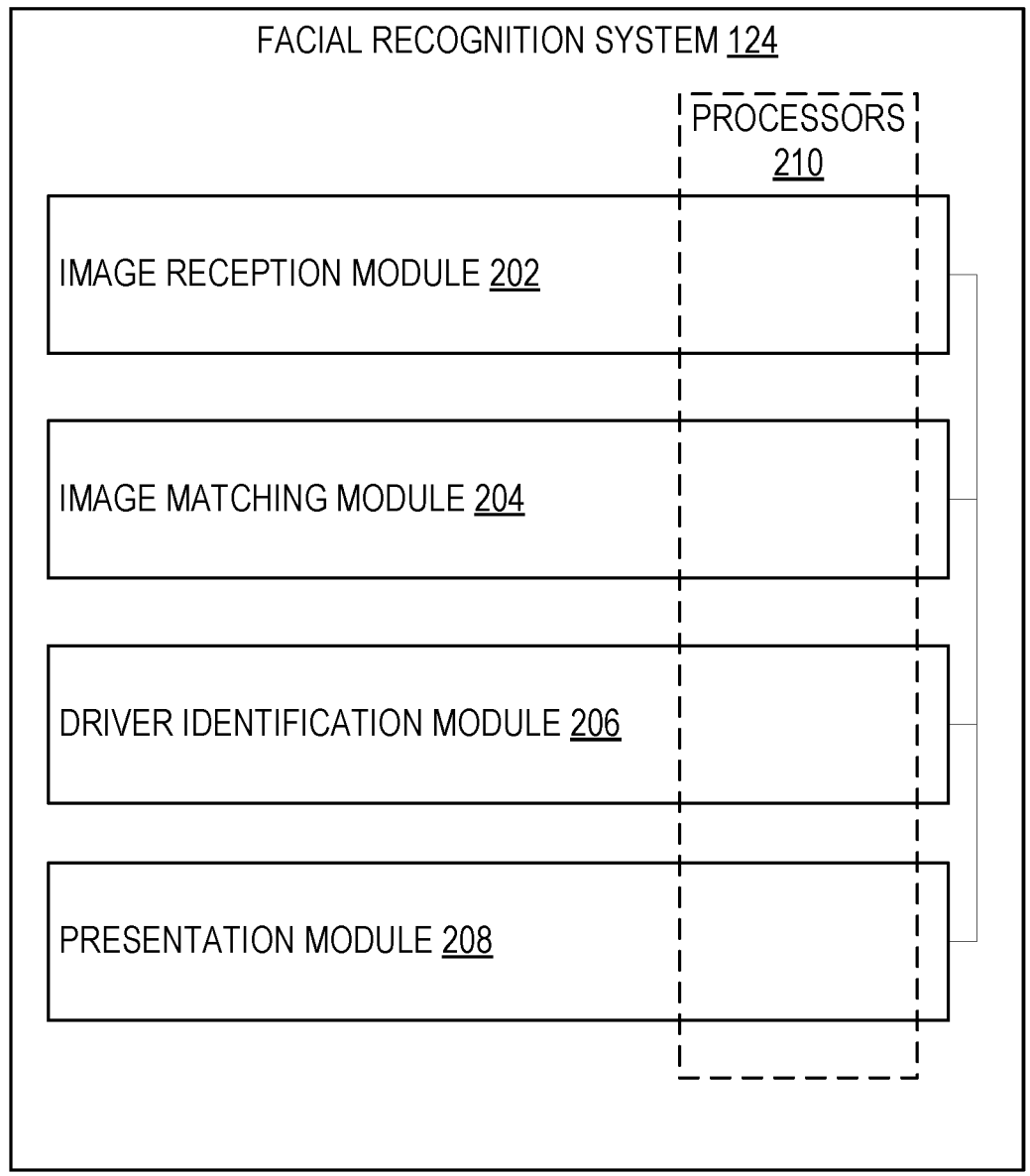
FIG. 2 is a block diagram illustrating various modules of facial recognition system, according to certain example embodiments.

FIG. 2 is a block diagram illustrating components of the facial recognition system 124.

The facial recognition system 124 is shown as including an image reception module 202, an image matching module 204, a driver identification module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the facial recognition system 124 may physically include an arrangement of one or more of the processors 210 (e.g., a subset of or among the one or more processors of the machine) configured to perform the operations described herein for that module. As another example, any module of the facial recognition system 124 may include software, hardware, or both, that configure an arrangement of one or more processors 210 (e.g., among the one or more processors of the machine) to perform the operations described herein for that module. Accordingly, different modules of the facial recognition system 124 may include and configure different arrangements of such processors 210 or a single arrangement of such processors 210 at different points in time. Moreover, any two or more modules of the facial recognition system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

As discussed above, according to certain example embodiments, the facial recognition system 124 may maintain one or more images or clubs of images, as explained in more detail below. In some embodiments, one or more portions of the images or clubs of images, as well as associated metadata, may be stored within the databases 120, at the server system 108, while in further embodiments, the portions may be stored at a local memory of the sensor devices 102, the gateway 104, as well as the client device 122.

The image reception module 202 may be configured to receive one or more digital images (e.g., from an inward-facing camera mounted on a dashboard of a vehicle), as discussed in more detail below. The image matching module 204 may be configured to match received images to other images and associate or dissociate images with clubs, as discussed in more detail below. The driver identification module 206 may be configured to determine an identification of a driver (e.g., based on application of a machine-learned matching algorithm to an image captured of the driver to a set of images known to correspond to the driver). The presentation module 208 may be configured to generate and present one or more user interfaces for using the improved facial recognition technology described herein to, for example, reduce or eliminate database records pertaining to unassigned hours of service such that a motor carrier may establish or maintain regulatory compliance.

Figure 3:
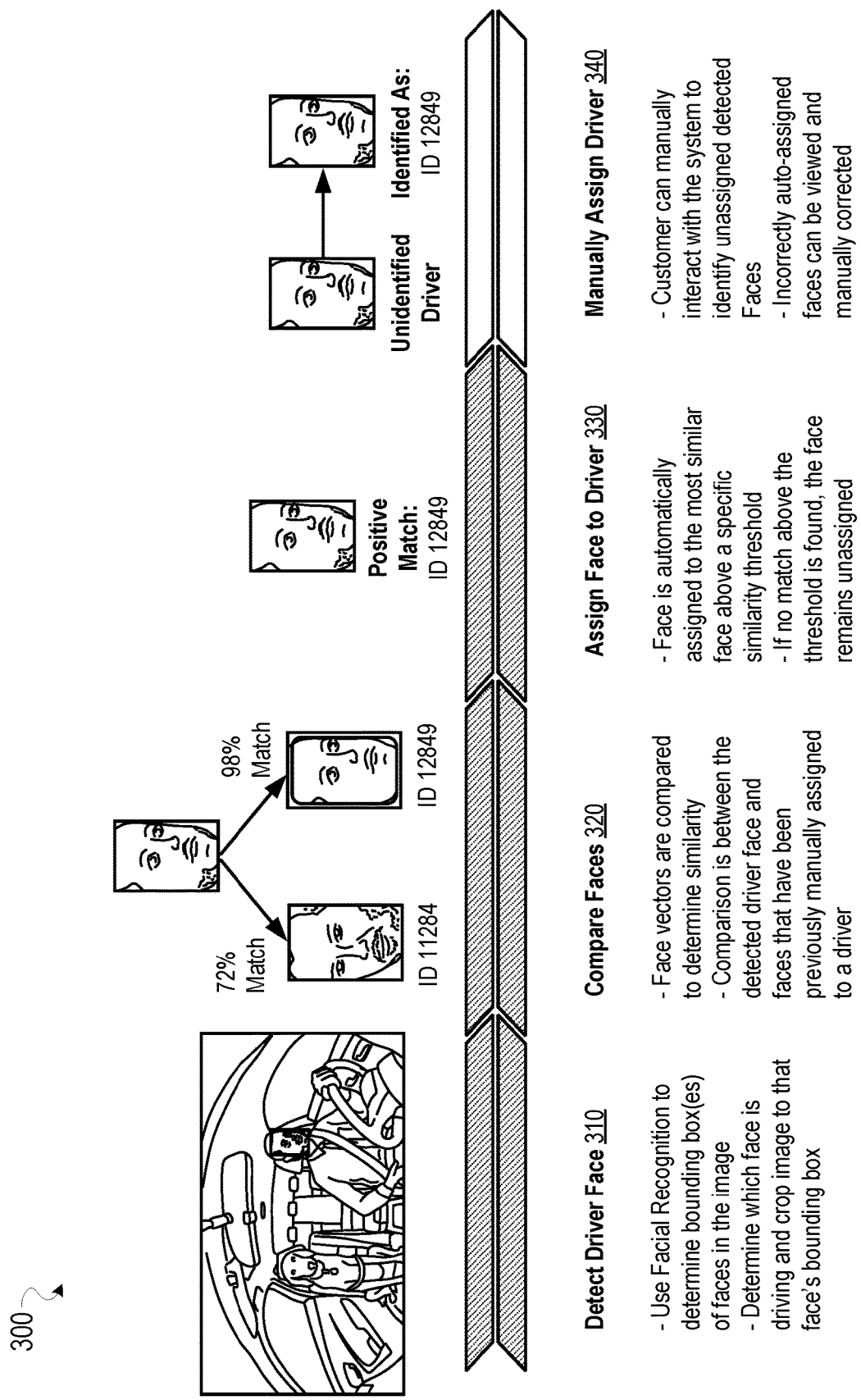
FIG. 3 is a flowchart depicting an example method of a facial recognition algorithm for identifying a driver of a vehicle.

FIG. 3 is a flowchart depicting an example method of a facial recognition algorithm for identifying a driver of a vehicle. In example embodiments, operations of the method 300 may be performed by the modules described above with respect to FIG. 2.

At operation 310 images of one or more faces are detected from an inward-facing camera mounted in a vehicle (e.g., on a dashboard of the vehicle). In example embodiments, the inward-facing camera is included in sensor device 102. In example embodiments, the images may be captured periodically during operation of the vehicle (e.g., every two seconds while the vehicle is moving) or a set of images may be captured when particular events are detected (e.g., in seconds or minutes each time the vehicle starts moving after having been at rest for a predetermined amount of time). Thus, for example, a sequence of images may be captured in a first succession (e.g., every half-second) when the vehicle starts moving after having its ignition turned on. The image capturing may then be turned off until the same or another predetermined event occurs or, alternatively, captured in a second succession (e.g., every minute, five minutes, and so on). In example embodiments, the image capture may be derived from a video capture, such as from a video that is captured at 30 or 60 frames per second. In example embodiments, the rate of capture and association of the rate of capture with respect to particular events is configurable (e.g., by an administrator via a user interface). Thus, for example, an administrator is able to configure the image capturing (e.g., the frame rate) to not only maximize quality of images and matches, but also to minimize use of computer resources to process the images, such as bandwidth, processing power, and computer memory (e.g., in accordance with specifications of a motor vehicle carrier).

One or more images of faces are detected within the captured image using facial recognition technology. Of the images of faces, it is determined which of images corresponds to a driver of the vehicle. For example, information about where the driver is seated in a particular vehicle may be accessed (e.g., from a database) and the image of the face corresponding to the driver may be identified based on the position of the image of the face within the vehicle. Or, for example, a wheel for controlling the vehicle may be detected in close proximity to an image of a face or in connection with a hands or body connected with the image of the face, and thus the image of the face may be inferred to be the driver of the vehicle. In example embodiments, a bounding box of the image of the face corresponding to the driver is identified and the image of the face is cropped (e.g., with respect to a bounding box associated with the image of the face).

At operation 320, the image of the face of the driver is stored in one or more databases. Additionally, metadata associated with the image, such as its quality, may be generated and stored in the one or more databases and associated with the image of the face of the driver. The quality may be measured in terms of one or more image-quality factors, including, for example, resolution, frame rate, size, contrast, brightness, color depth, a measured amount of blurriness, fuzziness, or other obfuscation; and so on. The image of the face of the driver is compared to other images of faces stored in the one or more databases. The comparison includes using face vectors, which may include information about the images themselves as well as the metadata associated with the images. In example embodiments, one or more images of faces that have been previously manually assigned to a driver are selected or prioritized for comparing to the image of the face of the driver. In example embodiments, for each comparison, a match percentage is calculated based on the face vectors.

At operation 330, if the image of the face of the driver matches a previously-stored image (e.g., based on the match percentage transgressing a match percentage threshold), the image of the face of the driver is assigned to an identifier associated with driver. In example embodiments, the face of the driver remains unassigned if the match percentage for the driver does not transgress the match percentage threshold.

In example embodiments, a set (e.g., or "club") of images may capture a face of a same driver from different viewing angles. In example embodiments, the club includes up to a configurable number (e.g., four) images. In example embodiments, each of the images in the club has a threshold degree of similarity to the other images in the club. For example, if a series of images of the driver is taken while the driver is operating a vehicle, one or more of the series may be added to the club (e.g., based on one or more factors, including a difference in a viewing angle of the image or a degree of similarity of the image with respect to the images that are already included in the club). In example embodiments, the image of the face of the driver is added to the club only when its similarity to the other images in the club transgresses a mean similarity threshold.

For example, in example embodiments, a driver (e.g., "Fred") is assigned to a club. In example embodiments, the assignment is based on input received from an administrator through an interactive user interface, as discussed in more detail below. In example embodiments, depending on the input received, multiple clubs of images may be merged (e.g., based on their similarities transgressing a similarity threshold) and specific images may be removed from the club. Additionally, when clubs are modified, they may be resubmitted as training data to a machine-learning algorithm to improve the performance of future similarity detection.

At operation 340, a user interface is presented to allow manual assignment of the face of the driver to an identifier associated with a driver. In example embodiments, the user interface includes options for manually assigning unassigned drivers to their corresponding identifiers and/or manually correcting incorrectly auto-assigned faces of drivers to identifiers, as described herein.

Figure 4:
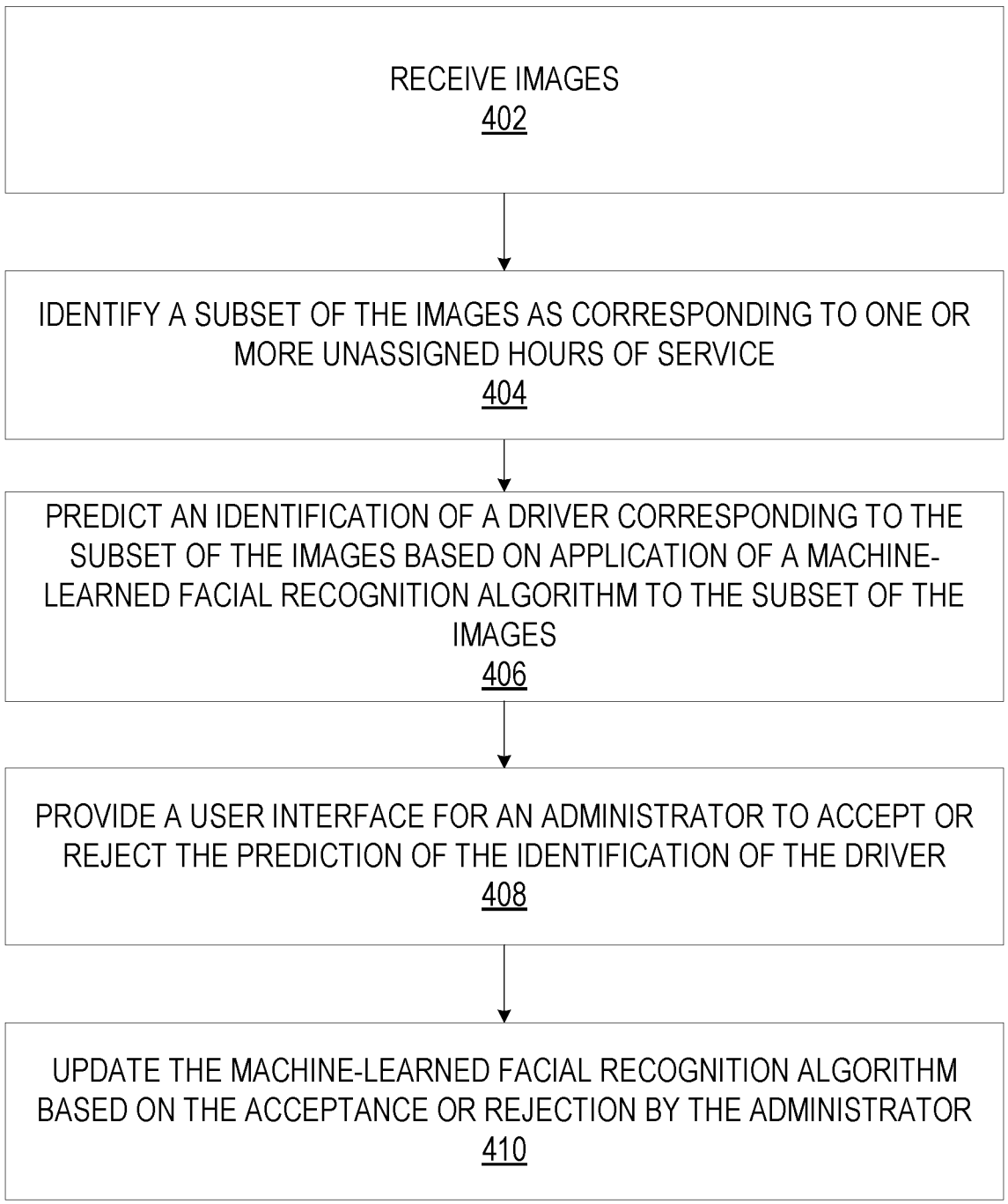
FIG. 4 is a flowchart depicting an example method of improving a facial recognition algorithm for identifying drivers of vehicles through machine learning.

FIG. 4 is a flowchart depicting an example method of improving a facial recognition algorithm for identifying drivers of vehicles through machine learning. In example embodiments, operations of the method 300 may be performed by the modules described above with respect to FIG. 2.

At operation 402, one or more images are received (e.g., from an inward-facing camera mounted in a vehicle, as discussed herein).

At operation 404, a subset of the images is identified as corresponding to one or more unassigned hours of service. In example embodiments, the unassigned hours of service include any hours of operation of a vehicle for which the driver of the vehicle is not recorded in an electronic database record used for establishing or maintaining regulatory compliance. In example embodiments, the identification of the subset of the images is based on a timestamp of the images corresponding to the hours of the unassigned hours of service. In example embodiments, other data may be used to identify the subset, including location data or other data (e.g., data captured by an ELD mounted in the vehicle).

At operation 406, an identification of a driver corresponding to the subset of the images is predicted. In example embodiments, the prediction is based on application of a machine-learned facial recognition algorithm to the subset of the images or a portion of the subset of the images, such as an image of a face included in one or more of the subset. In example embodiments, the matching is based on one or more of the images of the subset of the images having a similarity to a club of images associated with a known driver that transgresses a similarity threshold measurement or score.

At operation 408, a user interface is generated and provided for display on a client device. The user interface includes information pertaining to the prediction of the identification of the driver and user interface elements for an administrator to accept or reject the prediction of the identification of the driver. In example embodiments, when a machine-learned model associated with identifying an image of a driver reaches a configurable confidence level (e.g., 90%) with respect to the driver, operation 408 may be skipped, and the predicted driver may be automatically assigned to the vehicle, at least in a configurable percentage of cases. For example, for predicted images satisfying the threshold, operation 408 may only be performed as a safety precaution (e.g., 10% of the time) so that, in the event of a possible error in the prediction, an administrator may be able to correct that error despite the confidence of the prediction.

At operation 410, the machine-learned facial recognition algorithm is updated based on the acceptance or rejection of the prediction. For example, a new training data set is developed based on a modification to a club of images associated with one or more drivers or a modification of a measurement of a strength of similarities between images includes in the club of images. The new training data set is then used to train a model that is used as a replacement for the model used to predict the identification of the driver.

Figure 5:
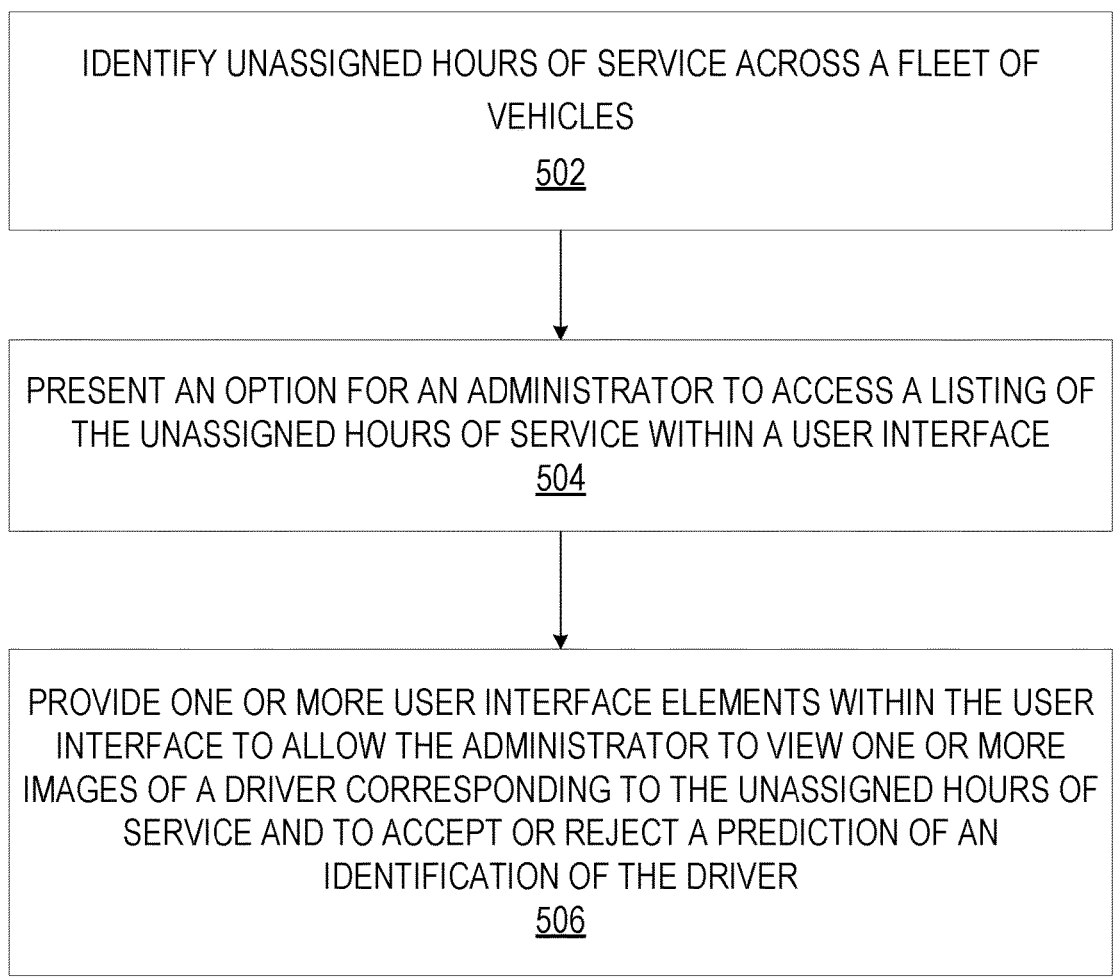
FIG. 5 is a flowchart depicting an example method of implementing batch processing of unassigned hours of service across a fleet of vehicles using facial recognition.

FIG. 5 is a flowchart depicting an example method of implementing batch processing of unassigned hours of service across a fleet of vehicles using facial recognition. In example embodiments, operations of the method 300 may be performed by the modules described above with respect to FIG. 2.

At operation 502, unassigned hours of service are identified across one or more fleets of vehicles (e.g., a fleet of vehicles of a motor carrier). For example, database records corresponding to RODS are filtered to identify all database records having unassigned hours of service.

At operation 504, an option is presented for an administrator to access a listing of the unassigned hours of service. For example, a user interface may be presented to the user in which a tab user interface element is selectable for accessing a subset of all of the database records pertaining to the vehicles in the fleet that have unassigned hours of service.

At operation 506, for at least a subset of the items in the listing, one or more user interface elements are provided within the user interface to allow an administrator to view one or more images of a driver corresponding to the unassigned hours of service. For example, the one or more images may be selected from captured images having a timestamp corresponding to a time period of the unassigned hours of service. In example embodiments, the one or more images may further be selected based on meta data associated with the images, such as image quality data. In example embodiments, assignment of a driver to unassigned hours of service may or may not be used (e.g., based on a configurable rule) to assign a driver to a safety event corresponding to a time period of the unassigned hours of service.

Additionally, one or more user interface elements are included within the user interface for accepting or rejecting predictions or recommendations for assignments of one of a plurality of drivers of the fleet of vehicles to each of the vehicles included in the subset. In example embodiments, the recommendations are generated based on an application of a machine-learned model to images of faces captured inside the one or more vehicles at a time period during the unassigned hours of service. In example embodiments, the accepting of rejecting of a recommendation may be fed back into the machine-learning algorithm (e.g., as training data for generating a new model). For example, one or more images may be added or removed from a club of images associated with a driver that is used for training the model.

Figure 6:
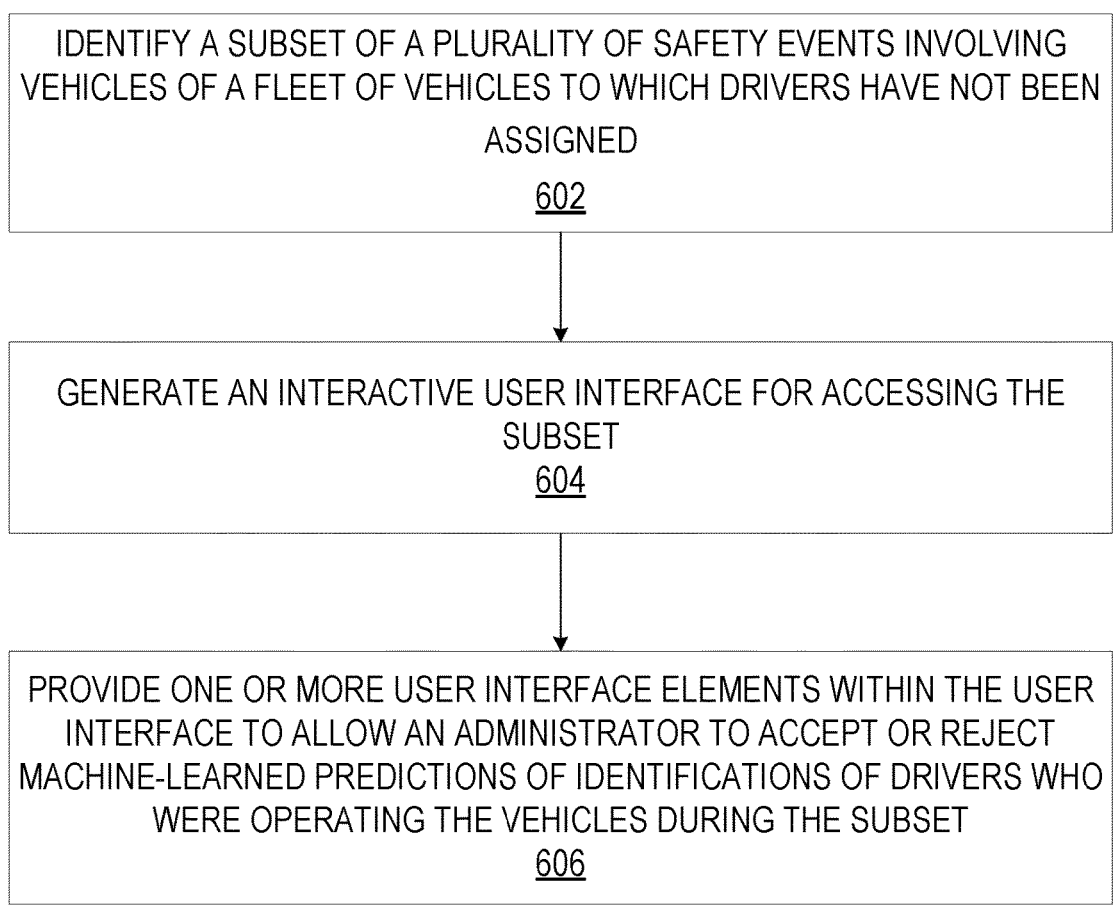
FIG. 6 is a diagram of an example method of improving driver safety across a fleet of vehicles.

FIG. 6 is a diagram of an example method 600 of improving driver safety across a fleet of vehicles. In example embodiments, operations of the method 300 may be performed by the modules described above with respect to FIG. 2.

At operation 602, a subset of a plurality of safety events involving vehicles of a fleet of vehicles is identified, the subset corresponding to vehicles to which drivers were not assigned during the plurality of safety events. In example embodiments, the safety events are identified based on event data received from one or more sensors included in the vehicle, as discussed herein. In example embodiments, the event data corresponding to each safety event is defined based on one or more characteristics of the event data (e.g., by an administrator via an administrative user interface). Additionally, each safety event may be associated with a configurable level of severity (e.g., a score reflecting that seriousness of the safety event).

At operation 604, an interactive user interface is generated for presentation on a client device for accessing the subset. In example embodiments, the user interface may include a Safety Inbox, such as the user interface depicted in FIG. 8. In example embodiments, the subset may be presented in order of the level of severity associated with each safety event in the subset. In example embodiments, one or more selected images of faces captured inside each vehicle when the corresponding safety event occurred may be presented alongside the listing of each safety event. In example embodiments, the images may be selected based on quality metrics associated with the images and a proximity of a time of the capturing of the images relative to the time of occurrence of each safety event.

At operation 606, one or more user interface elements are included within the user interface for accepting or rejecting recommendations for assignments of one of a plurality of drivers of the fleet of vehicles to each of the vehicles included in the subset. In example embodiments, the recommendations are generated based on an application of a machine-learned model to images of faces captured inside the one or more vehicles when the safety events occurred. In example embodiments, the accepting of rejecting of a recommendation may be fed back into the machine-learning algorithm (e.g., as training data for generating a new model). For example, one or more images may be added or removed from a club of images associated with a driver that is used for training the model.

In example embodiments, upon accepting a recommendation of an assignment of a driver to a safety event, one or more user interface may be provided for viewing additional safety events associated with the identified driver. In example embodiments, safety events for an identified driver may be shown in a separate sub-inbox that is dedicated to that specific driver. The sub inbox may include each of the safety events associated with the driver (e.g., in order of level of severity).

In example embodiments, user interface elements may be provided for taking one or more corrective actions with respect to a driver. For example, a corrective action may include providing a notification to the driver to complete an online learning or training module pertaining to a set of safety events that are associated with the driver. In example embodiments, progress of the driver toward completing the learning or training module may be tracked and presented in the user interface. Additionally, performance metrics associated with each driver may be continually monitored and updated to, for example, identify the effect on the safety record of each driver of having completed the learning or training module. Recommendations of learning and training modules specific to types of safety events may be learned (e.g., through additional machine-learning applications) and used to update the user interface with optimal driver-specific recommendations for corrective actions.

Figure 7:
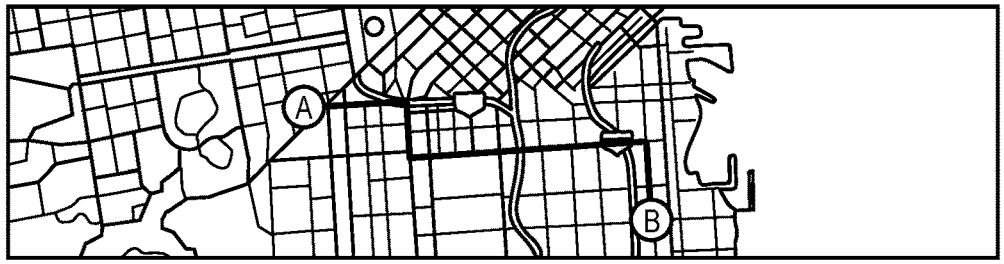
FIG. 7 is a diagram of an example user interface for assigning unassigned hours of service to a driver.
Figure 7:

FIG. 7 is a diagram of an example user interface 700 for assigning unassigned hours of service to a driver. In example embodiments, the user interface may depict a route (e.g., on a map) of operation of the vehicle corresponding to the unassigned hours of service for the vehicle. The user interface may also include a textual description of the route, including locations (e.g., physical addresses) and times or time periods at which the vehicle was present at the locations. In example embodiments, the user interface may include an identifier for the vehicle (e.g., an alphanumeric value assigned to the vehicle, such as "182231"), a length of time over which the vehicle was operations (e.g., 29 m 26 s), one or more images captured during the time period. Additionally, a suggested or predicted driver identification may be presented. For example, the predicted driver identification may be based on an application of the machine-learned facial recognition algorithm discussed above. In example embodiments, the user may include user interface elements for accepting or rejecting the predicted driver identification. For example, the user interface may include a drop-down menu for selecting a driver other than the predicted driver. Additionally, the user interface may include one or more user interfaces for selecting duty status. In example embodiments, the user interface may include an option to save or cancel any inputs provided, such as a selection of the driver assignment or duty status. Upon saving a record in which a driver assignment is made, additional instances of the user interface may be provided to, for example, sequentially assign the same predicted driver to other unassigned hours of service or to automatically move to a next unassigned driver record in a sequence of unassigned driver records for which one or more images of a driver have been captured and for which a predicted of driver identification has been made. In this way, an administrator may be able to more efficiently process unassigned driver records in order of records that are most likely to be easily resolved.

FIG. 8 is a diagram of an example user interface 800 for efficiently resolving unassigned hours of service for multiple vehicles. In this example, a series of database records associated with unassigned hours of service are presented as a list within a user interface. In example embodiments, the list is accessed by, for example, clicking on an "Unassigned" tab element associated with database records presented in the user interface. In example embodiments, the user interface includes a predicted driver identification for each of the vehicles in the list. The predicted driver identification may be based on application of a machine-learned facial recognition algorithm to images captured during operation of the vehicle within a time period corresponding to the unassigned hours of service. The user interface also includes a depiction of one or more of the captured images, which may be selected based on various criteria, as discussed above. The user interface also includes user interface elements for accepting or rejecting the predicted driver assignment. Although not depicted, the user interface may include a user interface element, such as drop-down box, for identifying a driver other than the predicted driver, such as the drop-down box shown with respect to FIG. 7.

FIG. 9 is a diagram of an example user interface 900 for improving driver safety. In this example, vehicles associated with a safety event, and for which a driver has not been assigned at the time of occurrence of the safety event, are presented in a user interface. In example embodiments, the user interface is made accessible based on an interaction with a user interface element (e.g., an "Inbox" link or button). A Safety Inbox is presented that includes a listing having one or more columns for various data elements, such as a vehicle identification number, an identification of a driver (or an indication of a lack of driver identification), event details (e.g., a type of the safety event, such as a harsh brake), and a location of the safety event. In example embodiments, a user interface element (e.g., an "Assign" button) is provided for assigning a driver to the safety event when the driver identification is not known. Upon activating the user interface element, an additional user interface may be presented for assigning the driver (e.g., such as the user interface shown in FIG. 7). Additionally, or alternatively, the listing may include in-line user interface elements for assigning predicted drivers to safety events, such as the user interface shown in FIG. 8). Although not shown in FIG. 9, one or more selected images received from sensors within the vehicle at the time of the safety event may be included in an additional column in the listing, as described herein. Once a driver has been assigned to a safety event, the interactive element for assigning the driver may be replaced with an identification of the driver (e.g., "Yuniel Rodriguez") within the listing. Additionally, as depicted, the user interface may include options for flagging, archiving, or dismissing one or more selected safety events. In example embodiments, assignment of a driver to a safety event may or may not be used (e.g., based on a configurable rule) to assign a driver to unassigned hours of service corresponding to a time of occurrence of the safety event.

Figure 10:
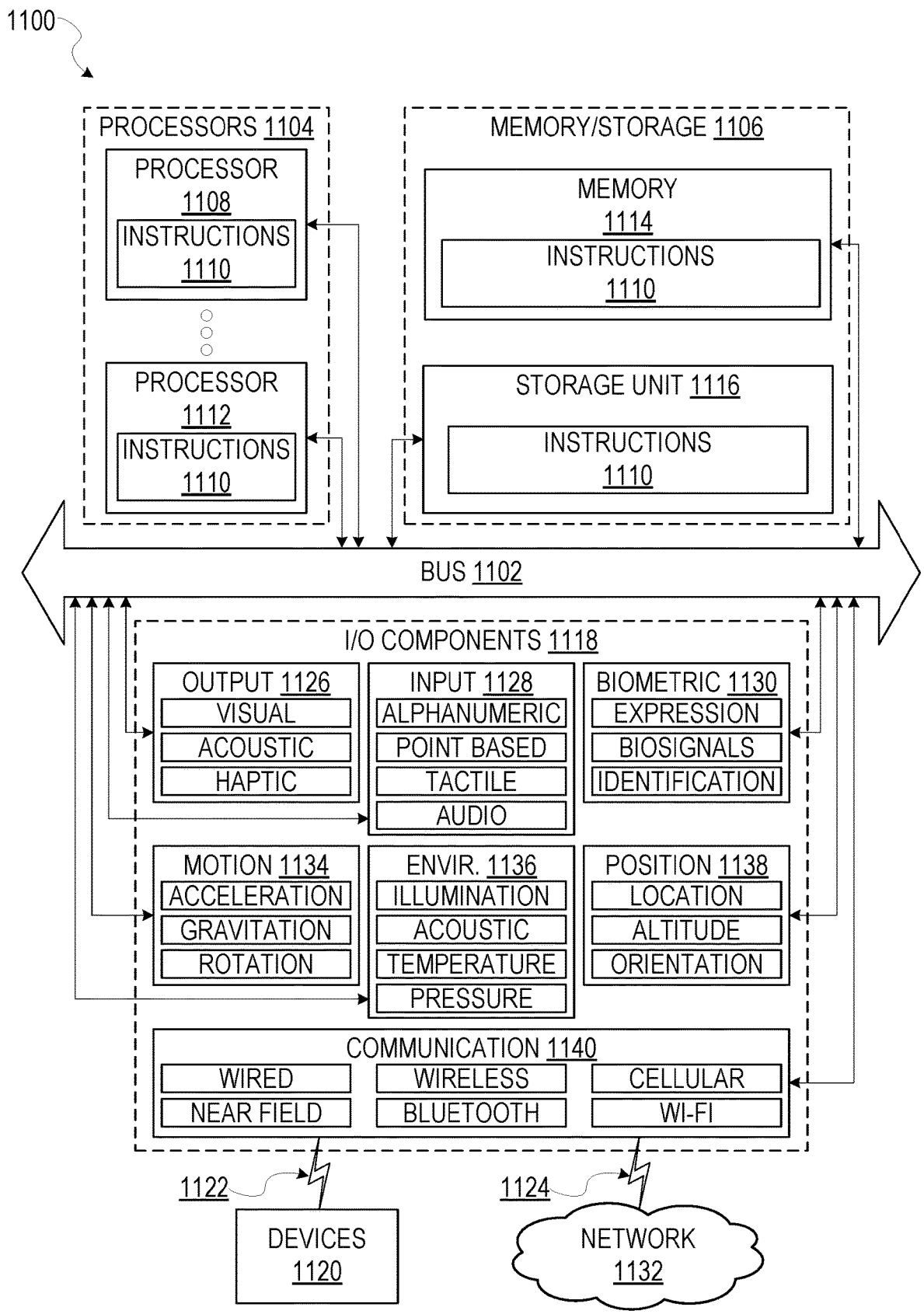
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1100, according to some example embodiments, able to read instructions from a machine-readable medium (e.g., a machine-readable storage medium) and perform any one or more of the methodologies discussed herein. Specifically, FIG. 10 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 10. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is provisionally claimed is:

1. A system comprising:
one or more computer processors;
one or more computer memories; and
a set of instructions incorporated into the one or more computer memories, the set of instructions configuring the one or more computer processors to perform operations, the operations comprising:
capturing a set of images of faces of one or more persons in a vehicle during an occurrence of one or more predefined events;
based on a determination that the vehicle has hours of service that have been assigned to no driver of a plurality of drivers during the occurrence of the one or more predefined events, identifying a candidate driver from the plurality of drivers based on an image of the face of the candidate driver having a degree of similarity to one or more images of the set of images, the degree of similarity transgressing a threshold level; and
generating a user interface for presentation on a client device, the user interface including an interactive user interface element for accepting or rejecting a recommendation to assign the candidate driver as a driver of the vehicle during the occurrence of the one or more predefined events.

2. The system of claim 1, wherein the one or more images were captured while a known person was operating the vehicle or an additional vehicle.

3. The system of claim 2, the operations further comprising, based on the accepting or rejecting of the recommendation, adding the image of the face of the candidate driver to the set of images.

4. The system of claim 1, the operations further comprising generating a training data set based on the accepting or rejecting of the recommendation, the training data set to be used to generate a machine-learned model usable for an additional identifying of the candidate driver.

5. The system of claim 1, the operations further comprising, based on the accepting or rejection of the recommendation, generating an additional user interface, the additional user interface including an interactive user interface element for accepting or rejecting an additional recommendation to assign the candidate driver OF an additional vehicle having hours of service that have been assigned to no driver of the plurality of drivers.

6. The system of claim 1, the operations further comprising generating an additional user interface for presentation on a client device, the additional user interface including one or more user interface elements for selecting the one or more predefined events from a plurality of predefined events, the plurality of predefined events including a starting of movement of the vehicle after a length of time of resting of the vehicle.

7. The system of claim 1, the operations further comprising based on a determination that the vehicle has additional hours of service that have been assigned to no driver, automatically assigning the driver to the additional hours of service, the automatically assigning based on an application of a machine-learned model to the candidate driver and the one or more images.

8. A method comprising:
capturing a set of images of faces of one or more persons in a vehicle during an occurrence of one or more predefined events;
based on a determination that the vehicle has hours of service that have been assigned to no driver of a plurality of drivers during the occurrence of the one or more predefined events, identifying a candidate driver from the plurality of drivers based on an image of the face of the candidate driver having a degree of similarity to one or more images of the set of images, the degree of similarity transgressing a threshold level; and
generating a user interface for presentation on a client device, the user interface including an interactive user interface element for accepting or rejecting a recommendation to assign the candidate driver as a driver of the vehicle during the occurrence of the one or more predefined events.

9. The method of claim 8, wherein the one or more images were captured while a known person was operating the vehicle or an additional vehicle.

10. The method of claim 9, further comprising, based on the accepting or rejecting of the recommendation, adding the image of the face of the candidate driver to the set of images.

11. The method of claim 8, further comprising generating a training data set based on the accepting or rejecting of the recommendation, the training data set to be used to generate a machine-learned model usable for an additional identifying of the candidate driver.

12. The method of claim 8, further comprising, based on the accepting or rejection of the recommendation, generating an additional user interface, the additional user interface including an interactive user interface element for accepting or rejecting an additional recommendation to assign the candidate driver OF an additional vehicle having hours of service that have been assigned to no driver of the plurality of drivers.

13. The method of claim 8, further comprising generating an additional user interface for presentation on a client device, the additional user interface including one or more user interface elements for selecting the one or more predefined events from a plurality of predefined events, the plurality of predefined events including a starting of movement of the vehicle after a length of time of resting of the vehicle.

14. The method of claim 8, further comprising based on a determination that the vehicle has additional hours of service that have been assigned to no driver, automatically assigning the driver to the additional hours of service, the automatically assigning based on an application of a machine-learned model to the candidate driver and the one or more images.

15. A non-transitory computer-readable storage medium storing a set of instructions that, when executed by one or more computer processors, causes the one or more computer processors to perform operations, the operations comprising:
capturing a set of images of faces of one or more persons in a vehicle during an occurrence of one or more predefined events;
based on a determination that the vehicle has hours of service that have been assigned to no driver of a plurality of drivers during the occurrence of the one or more predefined events, identifying a candidate driver from the plurality of drivers based on an image of the face of the candidate driver having a degree of similarity to one or more images of the set of images, the degree of similarity transgressing a threshold level; and
generating a user interface for presentation on a client device, the user interface including an interactive user interface element for accepting or rejecting a recommendation to assign the candidate driver as a driver of the vehicle during the occurrence of the one or more predefined events.

16. The non-transitory computer-readable storage medium of claim 15, wherein the one or more images were captured while a known person was operating the vehicle or an additional vehicle.

17. The non-transitory computer-readable storage medium of claim 16, the operations further comprising, based on the accepting or rejecting of the recommendation, adding the image of the face of the candidate driver to the set of images.

18. The non-transitory computer-readable storage medium of claim 15, the operations further comprising generating a training data set based on the accepting or rejecting of the recommendation, the training data set to be used to generate a machine-learned model usable for an additional identifying of the candidate driver.

19. The non-transitory computer-readable storage medium of claim 15, the operations further comprising, based on the accepting or rejection of the recommendation, generating an additional user interface, the additional user interface including an interactive user interface element for accepting or rejecting an additional recommendation to assign the candidate driver OF an additional vehicle having hours of service that have been assigned to no driver of the plurality of drivers.

20. The non-transitory computer-readable storage medium of claim 15, the operations further comprising generating an additional user interface for presentation on a client device, the additional user interface including one or more user interface elements for selecting the one or more predefined events from a plurality of predefined events, the plurality of predefined events including a starting of movement of the vehicle after a length of time of resting of the vehicle.

* * * * *